United States Patent
Favaro

(10) Patent No.: US 6,761,533 B2
(45) Date of Patent: Jul. 13, 2004

(54) PITCH GOVERNING ASSEMBLY FOR WINDMILLS

(75) Inventor: Primo Favaro, Woodbridge (CA)

(73) Assignee: Natus Technology Corp. (CA)

( * ) Notice: Subject to any disclaimer, the term of this patent is extended or adjusted under 35 U.S.C. 154(b) by 28 days.

(21) Appl. No.: 10/209,319

(22) Filed: Jul. 31, 2002

(65) Prior Publication Data

US 2004/0022628 A1 Feb. 5, 2004

(51) Int. Cl.[7] ................................................ F03D 7/04
(52) U.S. Cl. ......................................... 416/51; 416/136
(58) Field of Search .......................... 416/51, 136, 164, 416/166, 167, 113, 116, 89, 140

(56) References Cited

U.S. PATENT DOCUMENTS

| | | | | |
|---|---|---|---|---|
| 1,982,039 A | * | 11/1934 | Youngberg | |
| 2,096,860 A | * | 10/1937 | Renquist, et al. | |
| 2,196,573 A | * | 4/1940 | Wiste | |
| 4,374,631 A | * | 2/1983 | Barnes | 416/23 |
| 4,495,423 A | * | 1/1985 | Rogers | 4290/44 |
| 4,653,982 A | * | 3/1987 | Kojima et al. | 416/44 |
| 4,952,119 A | * | 8/1990 | Widseth | 416/3 |
| 5,286,166 A | * | 2/1994 | Steward | 416/89 |

FOREIGN PATENT DOCUMENTS

| | | | |
|---|---|---|---|
| CH | 636411 | * | 5/1983 |
| DE | 584505 | * | 9/1933 |
| EP | 0143061 | * | 5/1985 |
| FR | 565621 | * | 1/1924 |
| FR | 2371586 | * | 6/1978 |
| GB | 258952 | * | 10/1926 |

OTHER PUBLICATIONS

Communication from PCT Office regarding counterpart application.*

* cited by examiner

Primary Examiner—Edward K. Look
Assistant Examiner—J. M. McAleenan
(74) Attorney, Agent, or Firm—Harness, Dickey & Pierce, P.L.C.

(57) ABSTRACT

A pitch governing mounting assembly for a windmill blade and a windmill incorporating such an assembly. The assembly has a first member coupled to a second member in a manner which causes simultaneous axial and rotational movement of the second member relative to the first member. Input for axial movement of the second member relative to the first member is provided by centrifugal force arising from rotation of the windmill blades secured to the second member about a windmill input shaft. A biasing member is provided acting between the second member and the first member to urge the second member toward its first position relative to the first member as centrifugal input diminishes.

19 Claims, 9 Drawing Sheets

PITCH GOVERNING ASSEMBLY FOR WINDMILLS

FIELD OF THE INVENTION

This invention relates generally to wind powered generators and more particularly to apparatus for controlling the pitch of blades associated with such generators.

BACKGROUND OF THE INVENTION

A windmill utilizes an array of blades to convert wind energy into a rotational input to drive. In the case of a power generator, the rotational input drives an electrical current generator.

A challenge associated with harnessing wind energy is that wind speeds are inconsistent. In order to generate energy with minimal wind speeds, it is desirable to have a rather steep "pitch" to the blades which convert wind energy to rotational input. As wind speed picks up however it is preferable to have less of a pitch to avoid structural damage which might otherwise occur from rotational imbalance or too large a force input into the input shaft. Accordingly a governor assembly of some type is required in order to optimize windmill characteristics over a broad wind speed range.

Wind powered generating apparatus varies significantly in cost and complexity from large units operated by power generating companies to small units for residential use. In the case of large and sophisticated apparatus, control systems for such things as pitch may be quite complicated involving microprocessors and servo motors to optimize performance characteristics.

In the case of small generating units, cost considerations restrict the level of sophistication which may be built into any system for varying pitch of the windmill blades. Various devices exist for small wind driven generating apparatus which in general utilize centrifugal force associated with input shaft rotation and translate the centrifugal force to a rotational input on the blades through various assemblies utilizing gears, levers, pivots and other coupling arrangements.

A drawback to the prior arrangements is that they in general are mechanically complex which affects their reliability, expected life and maintenance requirements. Accordingly it is an object of the present invention to provide a simple pitch governing assembly for windmill blades which is mechanically simple, robust, reliable and inexpensive to manufacture.

SUMMARY OF THE INVENTION

A pitch governing mounting assembly is provided for securing a windmill blade to a windmill input shaft with a blade axis of the blade generally radially disposed relative to a rotational axis of the shaft. The governor reduces the pitch of the blade in response to an increase in rotational speed of the drive shaft. The assembly includes a first member connectable to the drive shaft and a second member connectable to an inner end of the blade. The second member is slidably received by the first member for relative axial movement therebetween along a governor axis generally aligned with the blade axis, between a first position and a second position. A rotator acts between the first member and the second member to cause rotation of the second member relative to the first member about the governor axis to reduce the pitch of the blade as the assembly moves from the first position to toward the second position. Biasing means are also provided which act between the first and second members to urge the assembly towards its first position.

The rotator may include a projection on one of the first and second members which registers with a slot or a groove on the other of the first and second members.

The second member may have a shaft which is received in a passage in the first member.

The assembly may further include a bearing disposed between the biasing means and at least one of the first and second members to reduce friction between the first and second members about the governor axis.

The biasing means may be a stack of Belleville washers. The second member may have a shaft which has a head at one end and is threaded at an opposite end for threadedly engaging the blade. The passage may be a bore extending through the first member for receiving the shaft. The rotator may be a pin extending from the shaft which engages a slot extending along the bore. The washers may extend about the shaft between the head and the first member. The bearing may be mounted between the biasing means and the first member. A respective thrust washer may be interspersed between the bearing and the biasing means and between the bearing and the first member.

The bore and the slot may be defined by a bushing mounted in the passage.

The slot may be hard faced.

The rotator may effect a total rotation of 18° between the first position and the second position.

A windmill may also be provided which incorporates a pitch governing mounting assembly for securing the windmill blades thereto in accordance with the above.

DESCRIPTION OF DRAWINGS

Preferred embodiments of the invention are described below with reference to the accompanying drawings in which.

DESCRIPTION OF PREFERRED EMBODIMENTS

Figure 1A:
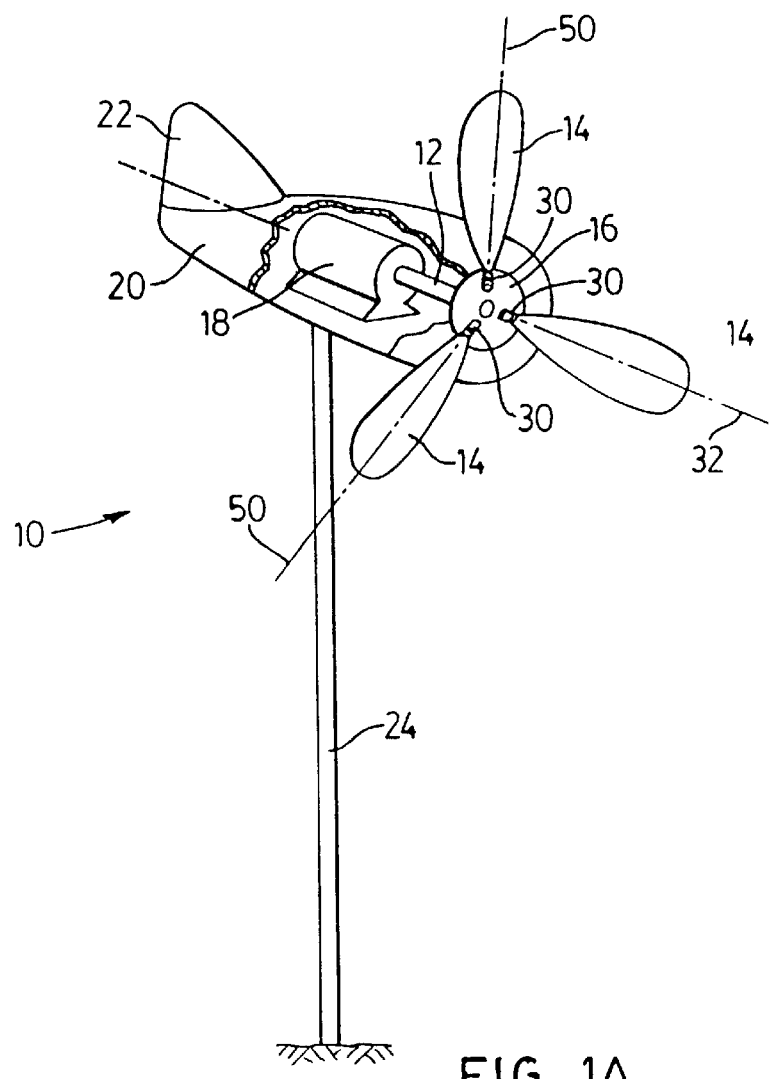
FIG. 1A is a perspective view of a windmill.

A windmill according to the present invention is generally indicated by reference 10 in FIG. 1A. The windmill 10 has an input shaft 12 for receiving rotational input from a plurality of blades 14. Three blades are illustrated however another number may be used. Generally at least two blades will be required for rotational balance.

The blades 14 are secured to a hub 16 at one end of the input shaft 12. The opposite end of the shaft 12 is connected to an electrical current generator 18. The connection is illustrated as being direct however it may be preferable to make the connection through a torque modifying coupling arrangement such as gears or sprockets. Each blade has a respective blade axis 50 generally radially aligned with the shaft 12.

In use, wind strikes the blades 14 which deflects the blades 14 causing rotational input into the input shaft 12 which in turn causes rotation of the electrical current generator 18 to produce electrical current. A streamlined outer cover 20 may be provided over the windmill. A fin 22 may be provided to align the windmill 10 with the blades in facing the wind. The windmill 10 may be mounted on a pole 24 to be in the path of stronger wind currents away from ground effects.

The blades 14 are joined to the hub 16 by respective pitch governing mounting assemblies 30 which are described in detail below. The assemblies 30 vary the pitch in response to rotational speed of the input shaft 12. The "pitch" is the inclination of a front face of the blades 30 relative to a plane perpendicular to an axis 32 of the input shaft 12. Zero pitch means that the blades 14 are generally unaffected by wind currents and cause virtually no rotational input in response thereto. Progressively steeper pitch angles give progressively greater rotational inputs until a point referred to as "stall" is reached. Stall will depend on the geometry of the blades 14 but would typically occur at about 18° of pitch.

Figure 1B:
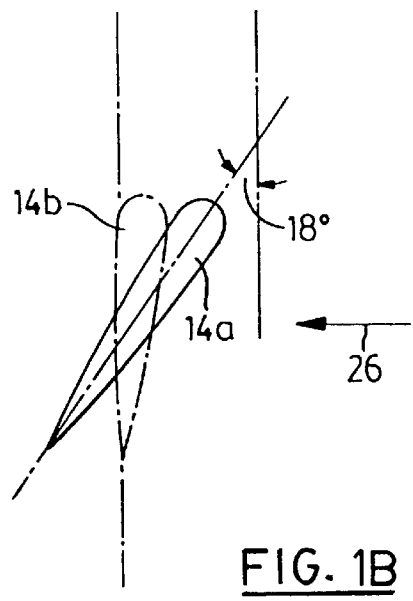
FIG. 1B is an end view of a windmill blade illustrating different pitch angles.
Figure 2:
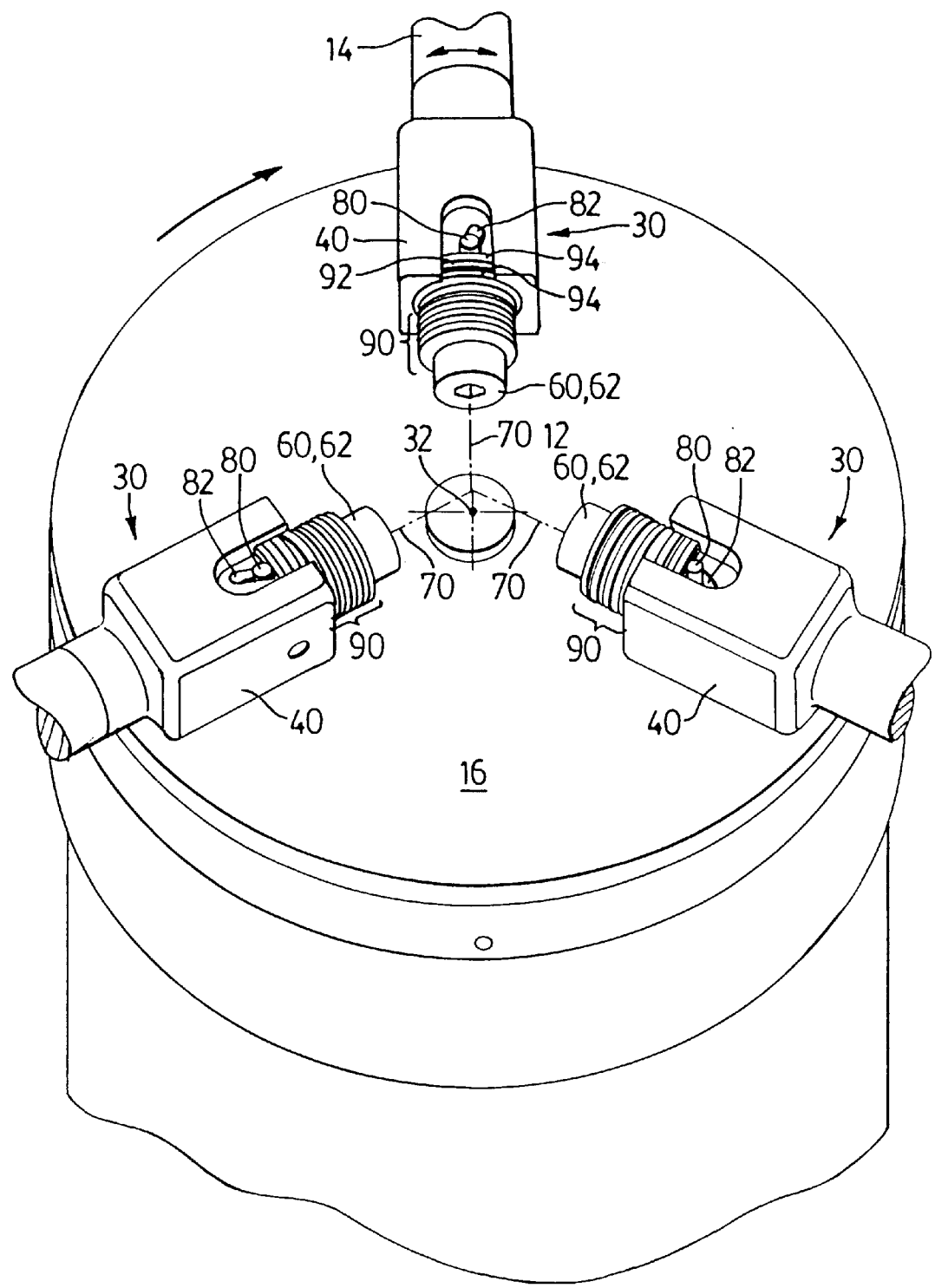
FIG. 2 is a perspective view of a hub of a windmill illustrating mounting assemblies according to the present invention.
Figure 3:
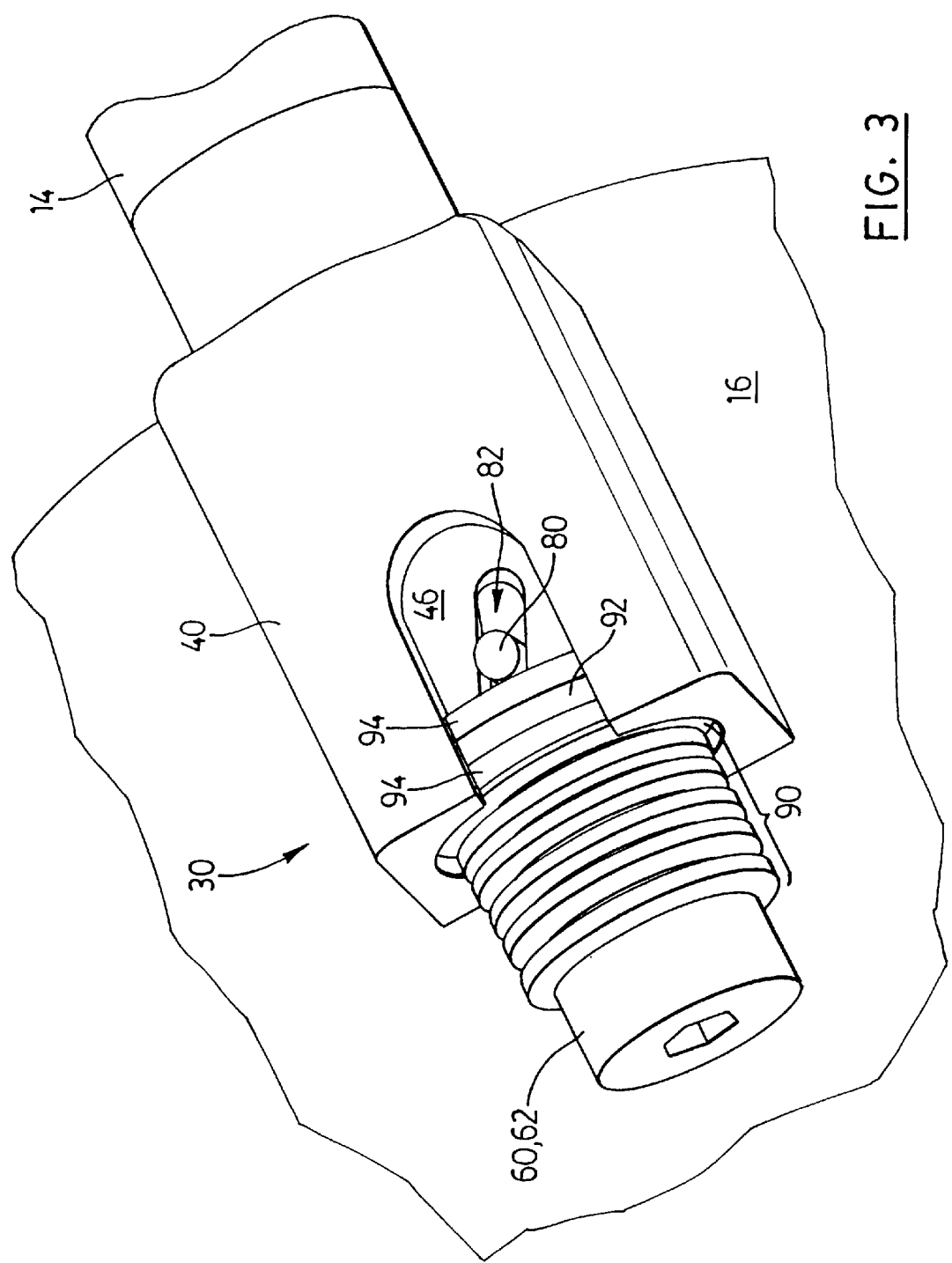
FIG. 3 is a perspective view of a pitch governing mounting assembly according to the present invention.
Figure 4:
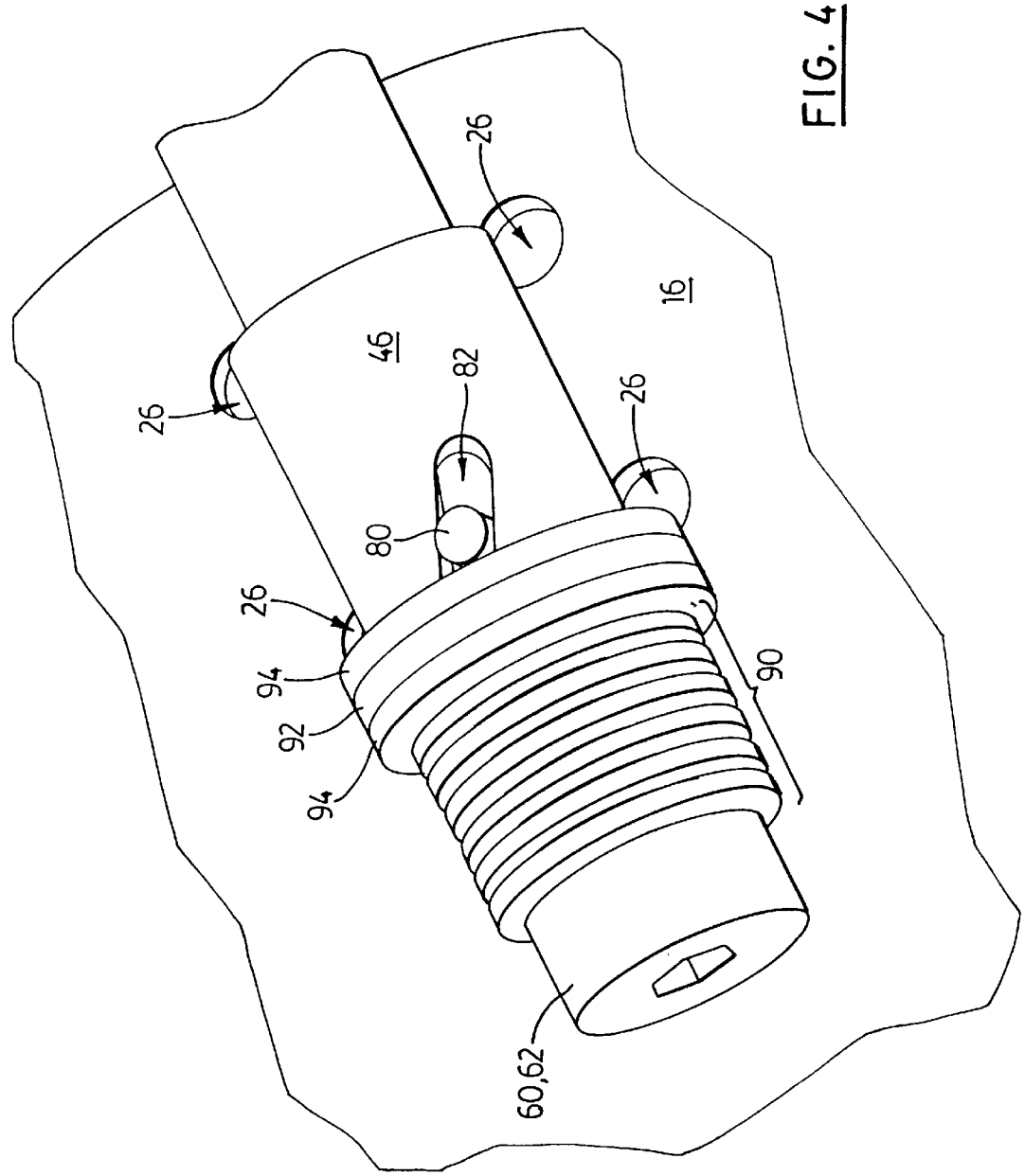
FIG. 4 is a perspective view corresponding to FIG. 3 with an outer housing removed; and, FIG. 5 is an axial sectional view of a pitch governing mounting assembly according to the present invention.
Figure 5:
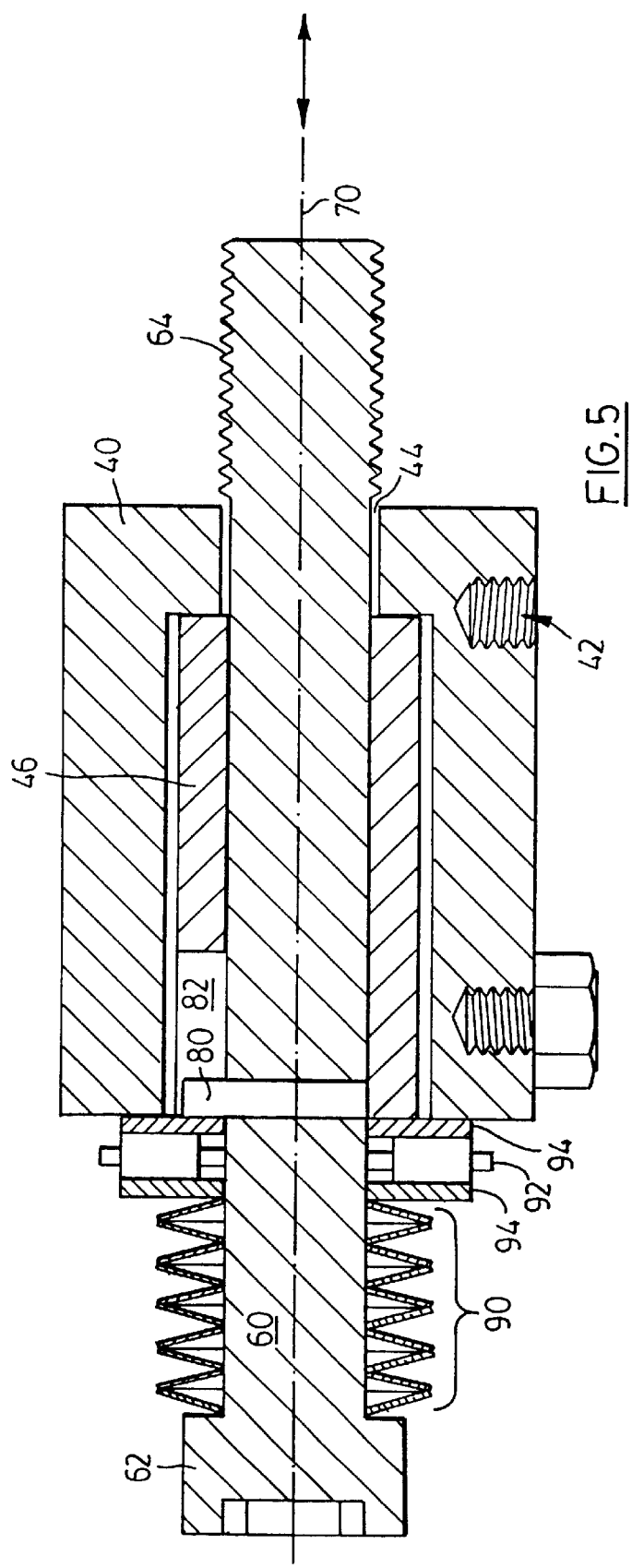

FIG. 1B illustrates what is meant by "pitch". Wind direction FIG. 1B is illustrated by arrow 26. Reference 14*a* illustrates a windmill blade at approximately 18° of pitch. Reference 14*b* illustrates a windmill blade at 0° pitch.

A first embodiment of a pitch governing mounting assembly 30 ("assembly 30") is illustrated in detail in FIGS. 2 through 5. Each assembly 30 has a first member 40 connectable to the input shaft 12, for example by securement to the hub 16.

Securement may be by way of screws extending through screw holes 26 in the hub 16 into threaded recesses 42 in the first member 40. Other arrangements are possible. For example the first member 40 may be integral with or welded to the hub 16.

As illustrated, the first member 40 has a passage 44 extending therethrough which is lined by a bushing 46 disposed therein.

A second member 60 extends through the passage 44 to be slidably received by the first member 40. The second member 60 may be a bolt, or analogous to a bolt and have a head 62 at one end and be threaded at an opposite end 64 for threaded securement of the second member 60 to the blades 14. The second member is axially moveable relative to the first member 40 along a governor axis 70.

The governor axis 70 of each of the assemblies 30 is preferably generally radially aligned with the axis 32 of the input shaft 12. Accordingly rotation of the assemblies 30 and the hub 12 about the axis 32 as the shaft 12 rotates will cause a centrifugal force tending to urge each second member 60 radially outwardly along its respective governor axis 70.

Figure 6:
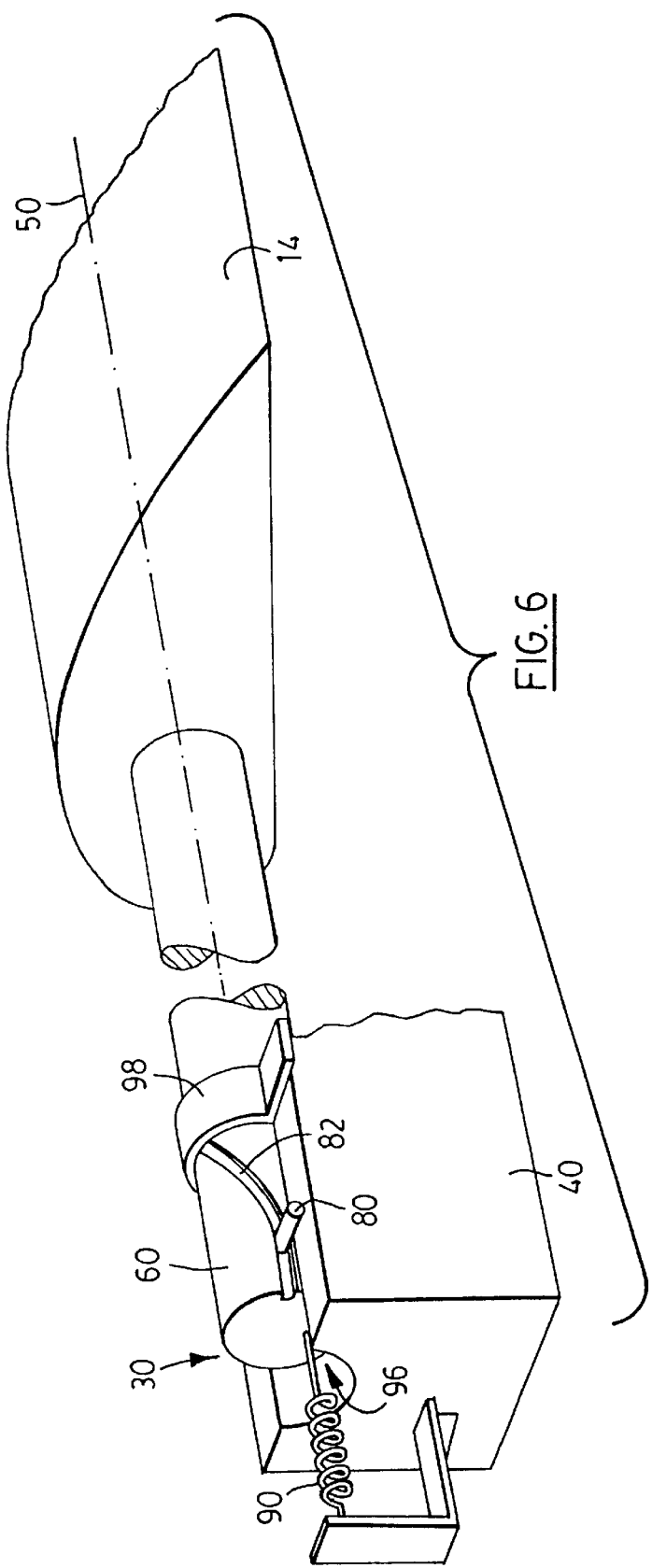
FIG. 6 is a perspective view of an alternate embodiment of a pitch governing mounting assembly according to the present invention.
Figure 7:
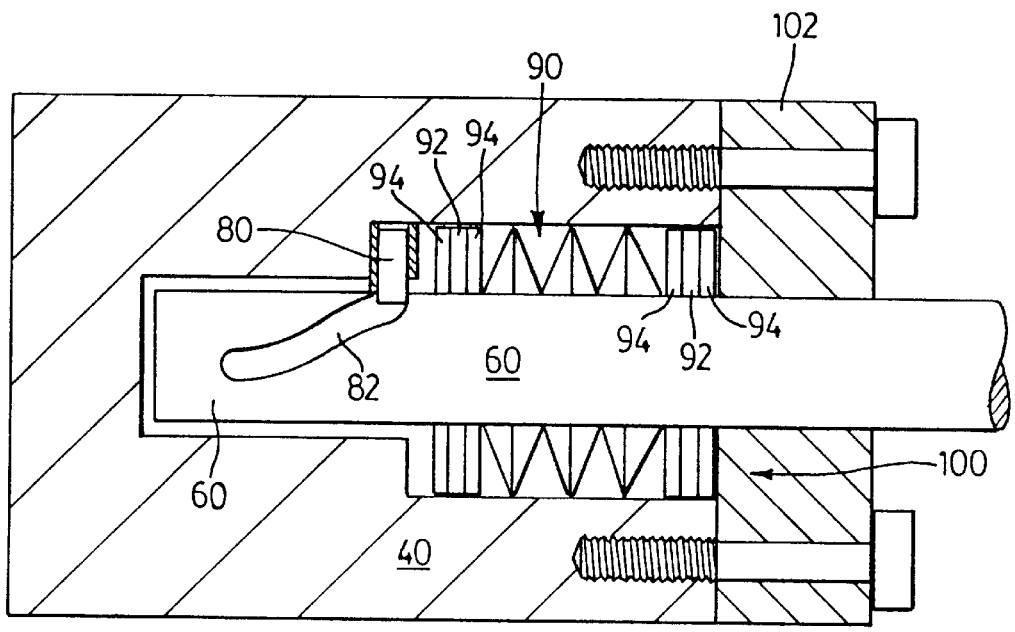
FIG. 7 is a sectional view through another alternate embodiment of a pitch governing mounting assembly according to the present invention; and, FIG. 8 is a sectional view through yet another alternate embodiment of a pitch governing mounting assembly according to the present invention.

The first member 40 and the second member 60 are coupled by a "rotator" which causes rotation of the second member 60 about the governor axis 70 relative to the first member 40 in response to axial movement along the governor axis 70 relative to the first member 40. The illustrated form of rotator includes a pin 80 which protrudes radially relative to the second member 60 and which is received in a slot or groove 82 running along the passage 44 at an angle to the governor axis 70. The pin 80 may be fixedly secured to one of the first member 40 and the second member 60 with the slot or groove 82 being disposed in the other of the first member 40 and the second member 60. FIGS. 2 through 5 and 8 illustrate the pin 80 being affixed to the second member 60. FIGS. 6, 7 illustrate the pin 80 extending into the slot 82 in the second member 60. FIGS. 9 through 12 illustrate the pin 80 being affixed to the first member 40 and extending all the way through the slot 82 to be held at both its ends.

Accordingly, in the illustrated arrangements, an anticlockwise rotation (as viewed from the blade tip) about the governor axis 70 will be imparted to the second member 60 as it moves radially outwardly relative to the input shaft axis 32 along the passage 44.

It will be appreciated that the movement back and forth of the pin 80 in the slot or groove 82 is a source of wear for the assembly 30. Preferably the material should be relatively hard wearing and possibly even surface treated to further reduce friction. If for example the slot 82 is provided in a bushing 46, at least the face of the slot which encounters the pin 80 should be hard faced through appropriate treatment. If the parts are metal, this might include nitriding, case hardening or deposition of a hard wearing ceramic coating.

Favourable results have been achieved by manufacturing the first and second members from aluminum in the FIGS. 9 through 12 design and applying a hard outer coating to the aluminum components by anodizing. This has proven effective enough to eliminate the need for a bushing or hard facing the bushing thereby providing a very simple, robust and cost effective design.

The above is but one embodiment for a suitable rotator, other arrangements will no doubt occur to persons skilled in mechanical coupling arrangements. For example the rotator could be reversed with a pin extending radially inwardly from the first member 40 into the passage 44 to be received by a slanted or helical groove in the second member 60. Alternatively the passage 44 and the corresponding portion of the second member 60 may be provided with helically curved splines which cause a "threading" and "unthreading" movement as the second member 60 moves axially relative to the first member 40.

Other rotator arrangements may be possible which embody a coupling arrangement that causes rotation in response to axial movement.

As the rotational speed of the input shaft 12 diminishes, it is desirable to once again increase the pitch of the blade 14. This may be achieved by providing a biasing means, such as indicated at reference 90 which acts between the head 62 of the second member 60 and the first member 40 to urge the second member 60 and in turn the attached blade 14 radially inwardly toward the input shaft 12. Accordingly the second member can move from an initial or first position illustrated to a second position radially outward of the first position in response to centrifugal forces and return to the first position by action of the biasing means 90 as rotational speed and ensuing centrifugal forces diminish.

The biasing means may be of any suitable configuration such as a coil spring, a resilient block, a gas filled strut or, as illustrated, cup washers, referred to also as "Belleville washers". Belleville washers are particularly well suited to the arrangement illustrated because of their very linear response characteristics.

In order to minimize frictional forces between the first member 40 and second member 60, a bearing, such as illustrated at reference 92 may be interspersed therebetween. To evenly distribute forces across the bearing 92, flat washers 94 may be provided between the bearing 92 and the biasing means 90 and between the biasing means 90 and the second member 60. Alternatively, the bearing 92 and the washers 94 could be interspersed between the head 62 of the second member 60 and the resilient biasing means 90.

The groove or slot 82 may be straight as illustrated in FIGS. 1 through 5, helical or a combination of both depending on the rotational response characteristics required and the force characteristics of the biasing means 90.

Figure 8:
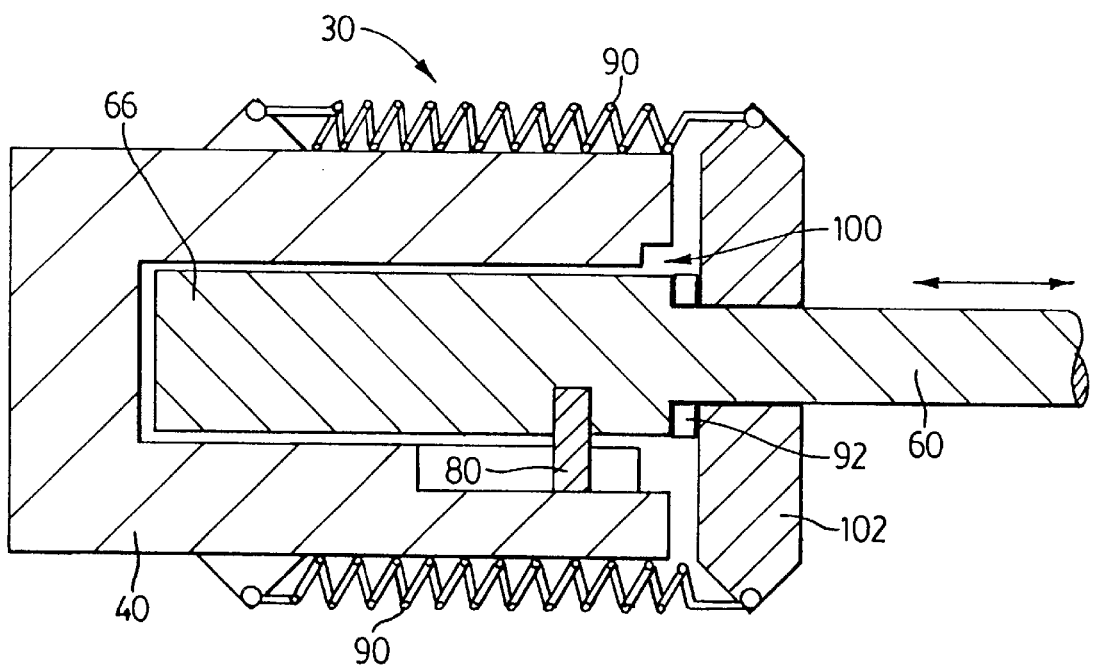
Figure 9:
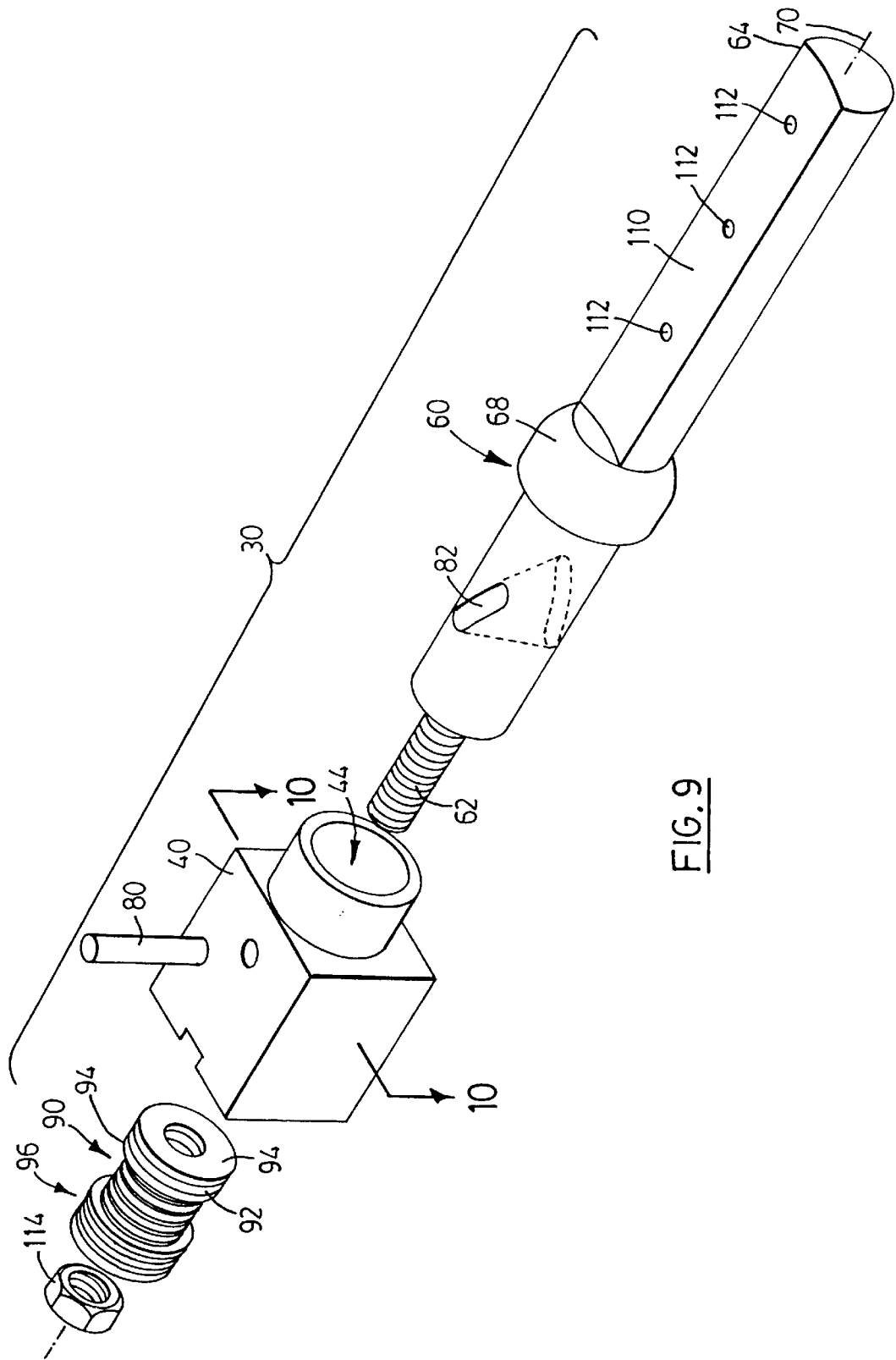
FIG. 9 is an exploded view of a still further alternate embodiment of a pitch governing mounting assembly according to the present invention.
Figure 10:
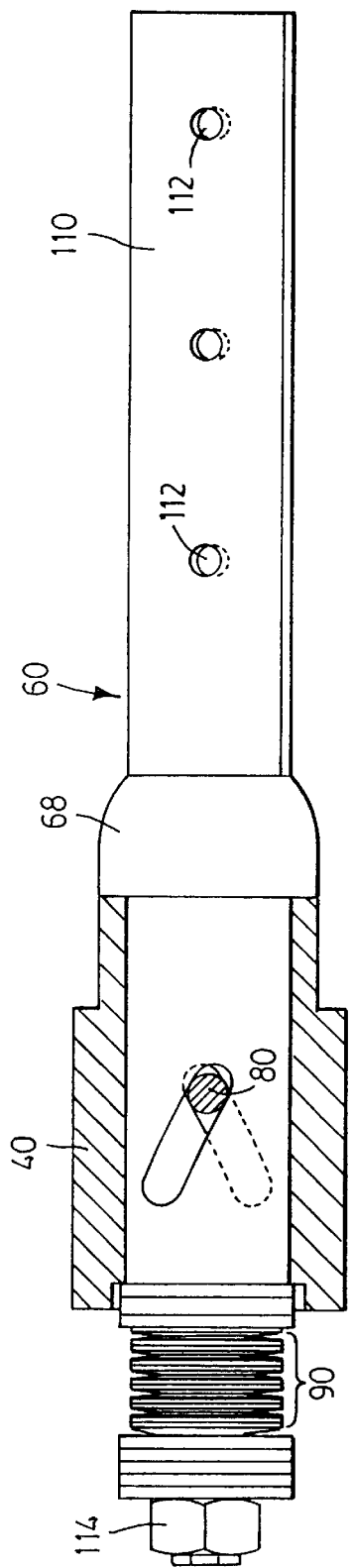
FIG. 10 is a top plan view, partially sectioned (see line 10—10 in FIG. 9) of the pitch governing mounting assembly of FIG. 9 in a maximum pitch configuration; and, FIG. 11 is a top plan view corresponding to FIG. 9 but illustrating a reduced pitch configuration.
Figure 11:
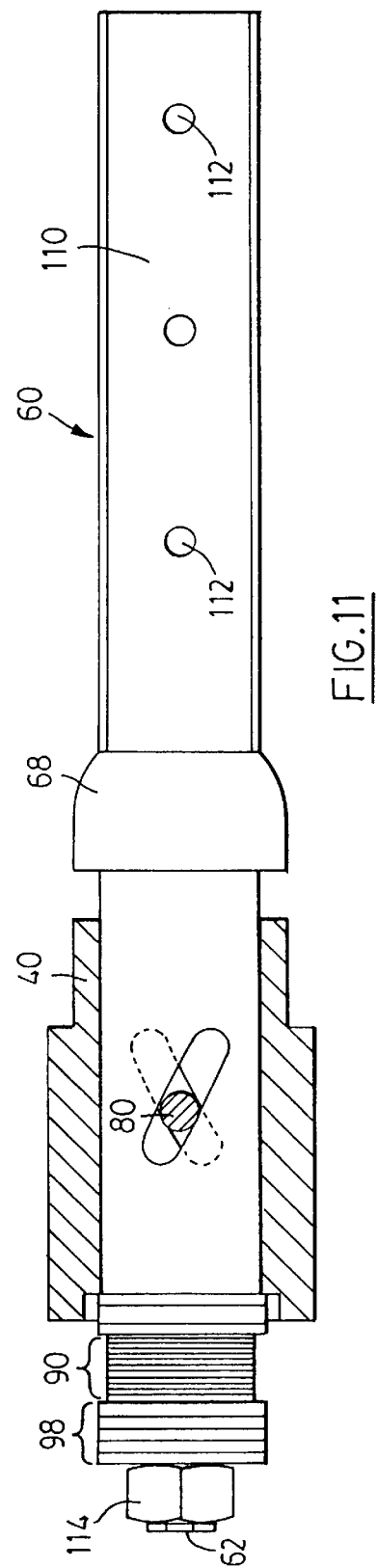

FIGS. 6, 7 and 8 illustrate alternate embodiments for an assembly 30 embodying the concepts underlying the present invention. The FIG. 6 embodiment utilizes a coil spring for the biasing means 90 and a substantially open channel 96 with a cap 98 to locate the second member 60 within the first member 40. The FIG. 7 embodiment houses an end 66 of the second member 60, the biasing means 90, the washers 94 and bearing 92 within a closed bore 100 capped at an outer end by a cover 102. The FIG. 7 embodiment also has the pin 80 extending radially inwardly from the first member 40 into a groove or slot 82 in the second member 60. FIG. 8 shows yet another arrangement wherein the "cover" 102 is biased by a pair of biasing members 90 in the form of coil springs.

FIGS. 9 through 12 illustrate different affixing means for the blade than in the remaining embodiments. According to the FIGS. 9 through 12 embodiment, in lieu of threads at the end 64 the first member 60 is provided with a flattened region 110 for abutting against a mounting face of the blade 14. Generally radially extending threaded holes 112 are provided for receiving bolts or rivets (not shown) to secure the blade thereto.

The FIGS. 9 through 12 embodiment is further threaded at the end 62 to receive a nut 114 which secures a stack of Belleville washers at reference 90 between it and the first member 40. A flange 68 is provided on the second member 60 to abut against the first member 40 to limit axial movement of the second member 60 toward the first member 40 by the Belleville washers at reference 90. A stack of flat washers 96 may be utilized to adjust the preload on the Belleville washers at reference 90.

The above description is intended in an illustrative rather than a restrictive sense. As indicated, variations to the exact embodiments described may be apparent to persons skilled in such structures without departing from the spirit or scope of the invention as set out in the claims below.

What is claimed is:

1. A pitch governing mounting assembly for securing a windmill blade to a windmill input shaft and reducing a pitch of said blade in response to an increase in a rotational speed of said drive shaft, said assembly comprising:
   a first member connectable to said input shaft;
   a second member connectable to an inner end of said blade and slidably received by said first member for relative axial movement between said first and second members, along a governor axis generally aligned with a blade axis of said blade, between a first position and a second position;
   a rotator acting between said first member and said second member to cause rotation of said second member relative to said first member about said governor axis to reduce said pitch of said blade in response to said relative axial movement from said first position toward said second position; and,
   biasing means acting between said first and second members to urge said assembly toward said first position, said biasing means being a stack of Belleville washers.

2. The pitch governing mounting assembly of claim 1 wherein:
   said rotator includes a projection extending from one of said first and second members which registers with a groove or slot on the other of said first and second members.

3. The pitch governing mounting assembly of claim 2 wherein:
   said second member has a shaft which is received in a passage in said first member.

4. The pitch governing mounting assembly of claim 3 wherein:
   said assembly further includes a bearing assembly disposed between said biasing means and at least one of said first and second members to reduce friction between said first and second members about said governor axis.

5. The pitch governing mounting assembly of claim 4 wherein:
   said shaft of said second member has a head at one end and is threaded at an opposite end for threadedly engaging said blade;
   said passage is a bore extending through said first member for receiving said shaft;
   said rotator is a pin extending from said housing which engages a slot extending along said bore; and,
   said Belleville washers extend about said shaft between said head and said first member.

6. The pitch governing mounting assembly of claim 1 wherein:
   said bore and said slot are defined by a bushing mounted in said passage.

7. The pitch governing mounting assembly of claim 5 wherein:
   said slot is hard faced.

8. The pitch governing mounting assembly of claim 4 wherein:
   said second member has a threaded end for receiving a nut, a mounting surface opposite said threaded end for receiving a mounting face of the blade, provision for securing said blade to said second member and a helical slot extending generally radially through said shaft;
   said passage is a bore extending through said first member for receiving said shaft;
   said rotator is a pin extending across said passage slidably engaging said slot and fixedly secured at opposite ends thereof against movement along and about said governor axis; and,
   said Belleville washers extend about said shaft between said nut and said first member.

9. The pitch governing mounting assembly of claims 1, 2, 3, 4, 5, 6, 7 or 8 wherein:

said rotator can effect a total rotation of 18° between said first position and said second position.

10. A windmill comprising:

an input shaft having an input shaft hub coaxial therewith at one end and connected to an electrical current generator at an opposite end;

a plurality of blades connected to said input shaft hub for rotating said input shaft about an input shaft axis in response to fluid flow past said blades; and, a pitch governing mounting assembly for securing said windmill blades to said input shaft hub, each said pitch governing mounting assembly having, a first member connectable to said input shaft, a second member connectable to an inner end of said blade and slidably received by said first member for relative axial movement between said first and second members, along a governor axis generally axially aligned with a blade axis of said blade and generally radially aligned with said shaft axis, between a first position and a second position, a rotator acting between said first member and said second member to cause rotation of said second member relative to said first member about said governor axis to reduce said pitch of said blade in response to said relative axial movement from said first position toward said second position, and, biasing means in the form of a stack of Belleville washers acting between said first and second members to urge said assembly toward said first position.

11. The windmill of claim 10 wherein:

said rotator includes a projection on one of said first and second members which registers with a groove on the other of said first and second members.

12. The windmill of claim 11 wherein:

said second member has a shaft which is received in a passage in said first member.

13. The windmill of claim 12 wherein:

said assembly further includes a bearing disposed between said biasing means and at least one of said first and second members to reduce friction between said first and second members about said governor axis.

14. The windmill of claim 13 wherein:

said second member has a shaft with a head at one end and threaded at an opposite end for threadedly engaging said blade;

said passage is a bore extending through said first member for receiving said shaft;

said rotator is a pin extending from said housing which engages a slot extending along said bore; and, said Belleville washers extend about said shaft between said head and said first member.

15. The windmill of claim 14 wherein:

said bore and said slot are defined by a bushing mounted in said passage.

16. The windmill of claim 15 wherein:

said slot is hard faced.

17. The windmill of claim 13 wherein:

said second member has a threaded end for receiving a nut, a mounting surface opposite said threaded end for receiving a mounting face of the blade, provision for securing said blade to said second member and a helical slot extending generally radially through said shaft;

said passage is a bore extending through said first member for receiving said shaft;

said rotator is a pin extending across said passage slidably engaging said slot and fixedly secured at opposite ends thereof against movement along and about said governor axis; and, said Belleville washers extend about said shaft between said nut and said first member.

18. The windmill of claims 10, 11, 12, 13, 14, 15, 16, and 17 wherein:

said rotator can effect a total rotation of 18° between said first position and said second position.

19. A windmill comprising:

an input shaft having an input shaft hub coaxial therewith at one end and connected to an electrical current generator at an opposite end;

a plurality of blades connected to said input shaft hub for rotating said input shaft about an input shaft axis in response to fluid flow past said blades;

a pitch governing mounting assembly for securing said windmill blades to said input shaft hub, each said pitch governing mounting assembly having, a first member connectable to said input shaft, a second member connectable to an inner end of said blade and slidably received by said first member for relative axial movement between said first and second members, along a governor axis generally aligned with a blade axis of said blade, between a first position and a second position, a rotator acting between said first member and said second member to cause rotation of said second member relative to said first member about said governor axis to reduce said pitch of said blade in response to said relative axial movement from said first position toward said second position, and, biasing means acting between said first and second members to urge said assembly toward said first position, said biasing means being a stack of Belleville washers.

* * * * *